Nov. 7, 1950 H. N. NEWSTEDT 2,529,410

SYSTEM FOR CONTROLLING COIN RECEPTACLES
OF PAY STATION TELEPHONES

Filed July 2, 1947 5 Sheets-Sheet 1

INVENTOR.
HARRY N. NEWSTEDT
BY Wm. Walter Owen
ATTORNEY

Nov. 7, 1950 H. N. NEWSTEDT 2,529,410

SYSTEM FOR CONTROLLING COIN RECEPTACLES OF PAY STATION TELEPHONES

Filed July 2, 1947 5 Sheets-Sheet 2

INVENTOR.
HARRY N. NEWSTEDT

BY Wm. Walter Owen.

ATTORNEY

Nov. 7, 1950 H. N. NEWSTEDT 2,529,410

SYSTEM FOR CONTROLLING COIN RECEPTACLES OF PAY STATION TELEPHONES

Filed July 2, 1947 5 Sheets-Sheet 3

INVENTOR.
HARRY N. NEWSTEDT

BY Mc Watters Durew

ATTORNEY

INVENTOR.
HARRY N. NEWSTEDT
BY Wm. Walter Owen.
ATTORNEY

INVENTOR.
HARRY N. NEWSTEDT
BY Wm. Watts Owen
ATTORNEY

Patented Nov. 7, 1950 2,529,410

UNITED STATES PATENT OFFICE 2,529,410

SYSTEM FOR CONTROLLING COIN RECEPTACLES OF PAY STATION TELEPHONES

Harry N. Newstedt, Chicago, Ill., assignor to Automatic Electric Laboratories, Inc., Chicago, Ill., a corporation of Delaware Application July 2, 1947, Serial No. 758,696

5 Claims. (Cl. 179—6.3)

The present invention relates to telephone systems in general and, more particularly, to improved circuits and apparatus for controlling the operation of the coin control mechanisms of paystations forming a part of an automatic telephone system.

In the usual automatic telephone system, a portion of the substations are of the paystation type, each including means for receiving coins, slugs, or the like, and a coin control mechanism for controlling the coin refunding and collecting operations normally required incident to the use of the station. Accordingly, the automatic switching apparatus must be suitably arranged automatically to control the paystation coin control mechanisms incident to the use of local connections involving the paystations and must include apparatus for permitting operators selectively to control the mechanisms so that the proper charges and collections may be made incident to the use of toll connections involving the paystations. Prior automatic telephone systems including these paystation control features are usually arranged to provide for automatically refunding a coin which was deposited to permit a connection to be extended from a paystation to an operator at a toll switchboard. Coins subsequently deposited to provide for the payment of the charges for the desired calls are collected or refunded by the operator dependent on the service rendered on the connection. Should the operator for any reason fail to dispose of the deposited coins they will remain in the coin control mechanism until the paystation is again used and will eventually be collected or refunded in accordance with the control then exercised on the coin control mechanism.

It is an object of the present invention to provide, in an automatic telephone system, means for automatically operating the coin control mechanism of a paystation in case the operator disconnects and fails to make any disposition of the coins deposited therein.

It is another object of the present invention to provide, in an automatic telephone system, apparatus which can be operated at will by an attendant or which can be automatically operated to control the coin control mechanism at a paystation.

It is a further object of the present invention to provide for automatic collection of coins deposited in a coin control mechanism in case no other disposition is made of the coins.

A feature of the present invention relates to the use of the power source which operates the coin control mechanism to operate part of the control apparatus in central office switching equipment.

Other features of the invention not specifically mentioned will be apparent from the following description.

Referring now to the drawings comprising Figs. 1 to 6, inclusive;

Figure 1:
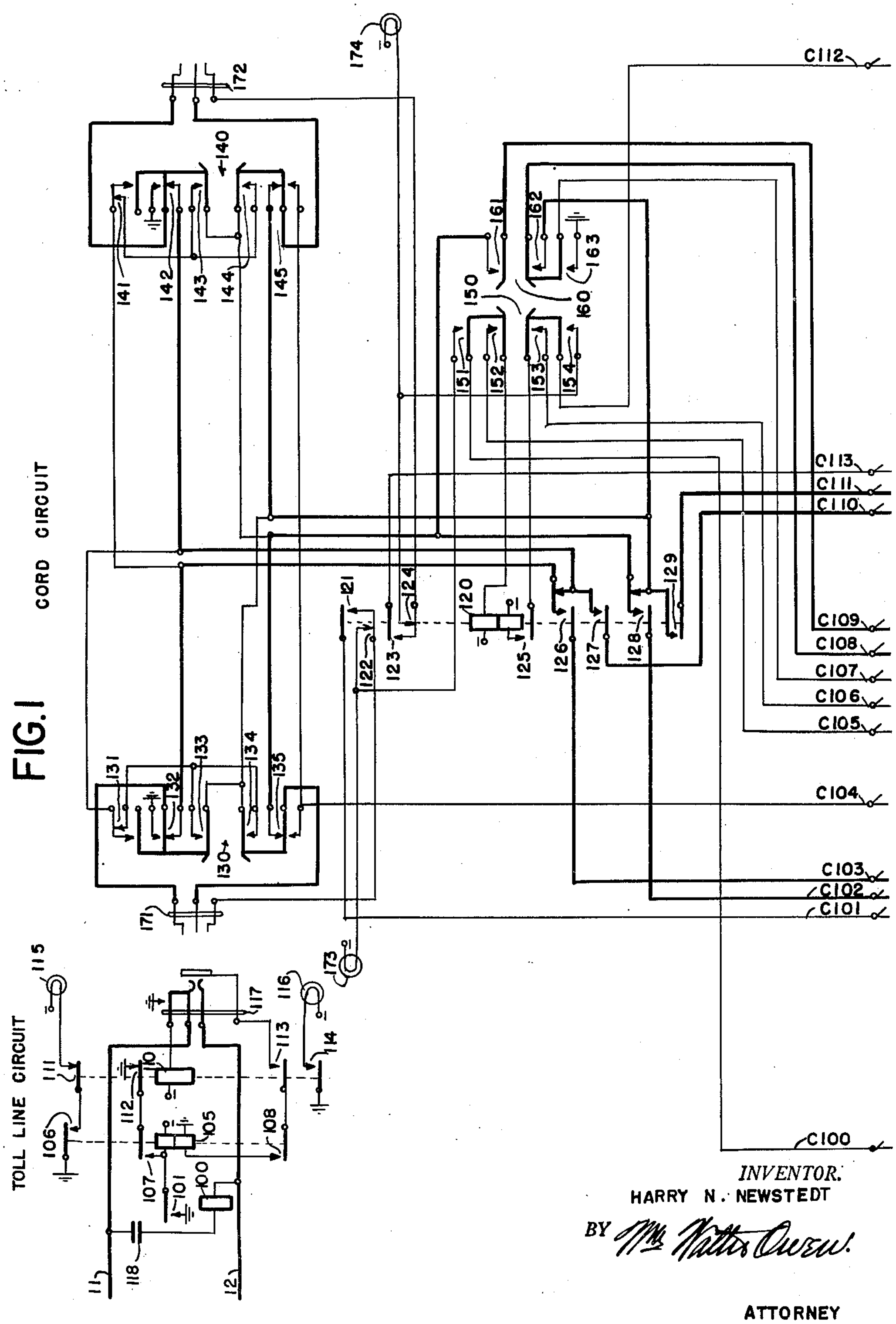
Fig. 1 shows a toll line circuit to a distant exchange and a cord circuit at a manual switchboard.

The toll line circuit shown in Fig. 1 is the conventional jack ended type and may be one of a number of such lines extending to a distant city. The cord circuit shown in Fig. 1 is the universal type and is one of a number of cord circuits at an operator's position. The cord circuits, of which the cord circuit in Fig. 1 is typical, may be individually connected to the operator's telephone and common equipment in Figs. 2 and 3 over the common conductors C100 to C113 inclusive. The plug 171, the ringing key 130 and the signal lamp 173 are associated with one end of the cord circuit while the plug 172, the ringing key 140 and the signal lamp 174 are associated with the other end of the cord circuit. One of the talking conductors of the cord circuit extends from the upper conductor of the plug 171 thru normally closed contacts of the relay 120 to the upper conductor of the plug 172. The other talking conductor of the cord circuit extends from the center conductor of the plug 171 thru normally closed contacts of the relay 120 to the center conductor of the plug 172. The operation of the talk key 150, and the operation of the relay 120 under joint control of the talk key 150 and operator's telephone 200 over the conductors C105 and C106 associates the cord circuit in Fig. 1 with the operator's telephone 200 and the operator's common equipment in Figs. 2 and 3. The monitor key 160 also serves to associate the cord circuit in Fig. 1 with the operator's telephone 200 over the conductors C107, C108 and C109, the conductor C107 being a control conductor to arrange the operator's telephone 200 particularly for monitoring.

The operator's telephone 200 is equipped with the usual talking instrumentalities which, with the talk key 150 and the relay 120 operated, are connected to the talking conductors of the cord circuit in Fig. 1 thru condensers 228 and 229 over the conductors C102, C103, C110 and C111. The operation of the relay 220 under control of the key 286 disconnects the talking conductors associated with the plug 171 from the operator's telephone 200, while the operation of the relay 225 under control of the key 287 disconnects the talking conductors associated with the plug 172 from the operator's telephone 200. The relay 235 which operates under control of either the key 286 or the key 287 prevents the connection of the dial 269 to the end of the cord circuit disconnected from the operator's telephone 200. When the dial 269 is moved off normal, its three upper contacts are closed, and if the key 280 is normal, the relays 225 and 230 are operated. The relay 225 connects the upper and center conductors of the plug 172 to the impulsing contacts, i. e., the two lower contacts, of the dial 269. The relay 230 disconnects the lower conductor of the plug 172 from negative battery to transfer the control of the bridge in an associated circuit, such as the trunk circuit in Fig. 4, to the impulsing contacts of the dial 269. If the key 280 is operated and the dial 269 moved off normal the relays 215 and 220 are operated, the relay 220 connecting the upper and center conductors of the plug 171 to the impulsing contacts of the dial 269 and the relay 215 disconnecting negative battery from the lower conductor of the plug 171.

Figures 3, 6:
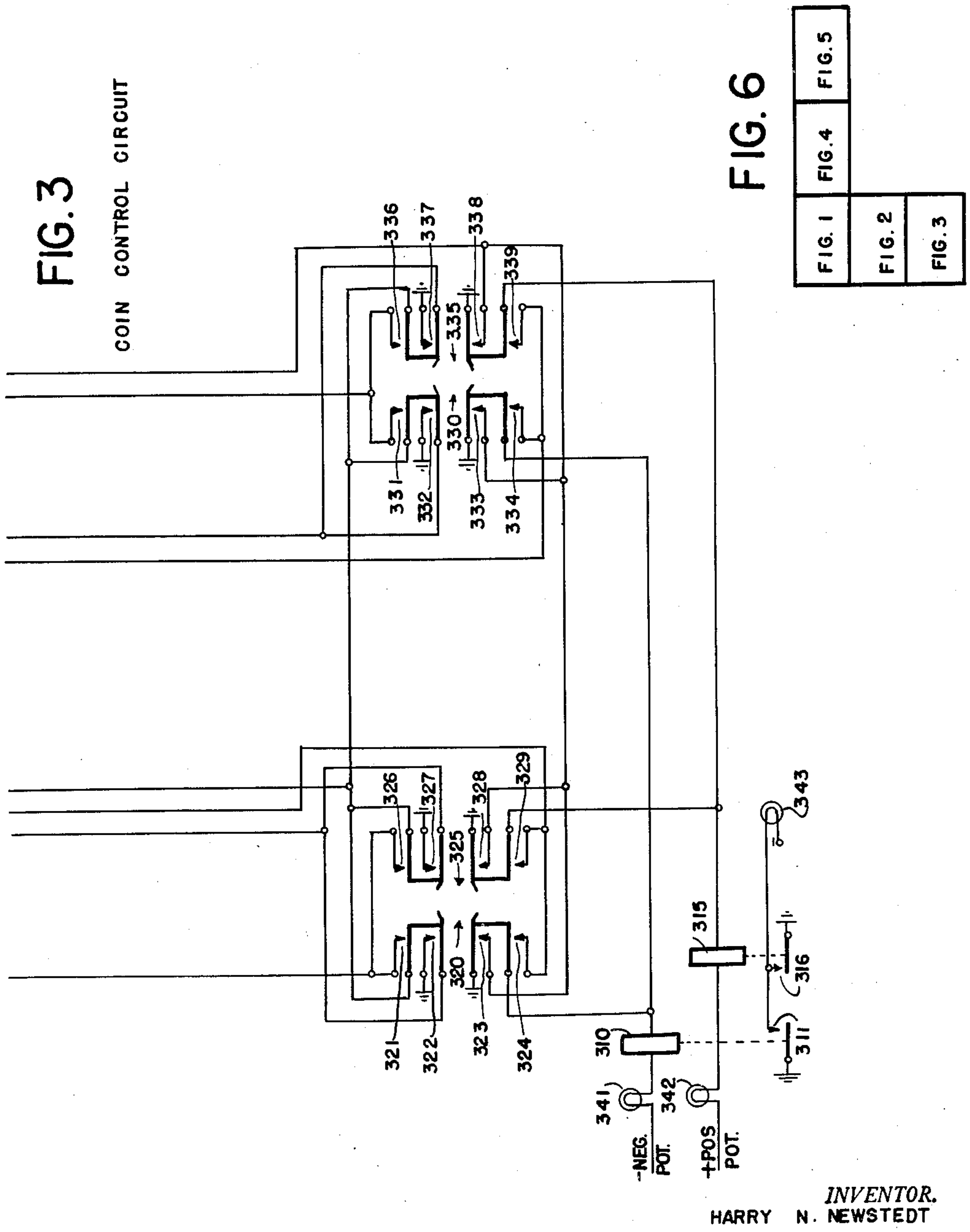
Fig. 3 shows a circuit for the operator's common equipment for controlling the coin control mechanisms of paystations.
Fig. 6 is a drawing layout showing how Figs. 1 to 5, inclusive, are to be assembled.

The common equipment shown in Fig. 3 provides manual coin control. The operation of the key 320 operates the relays 215 and 220, grounded negative potential Neg. Pot. being connected to the upper conductor of the plug 171, ground being connected to the center conductor of the plug 171, and the lower conductor of the plug 171 being disconnected from battery. The operation of the key 325 also causes the operation of the relays 215 and 220 but in this case grounded positive potential Pos. Pot. is connected to the upper conductor of the plug 171. The operation of the keys 330 and 335, in co-operation with the relays 225 and 230, exercises similar controls over the conductors of the plug 172.

Figure 4:
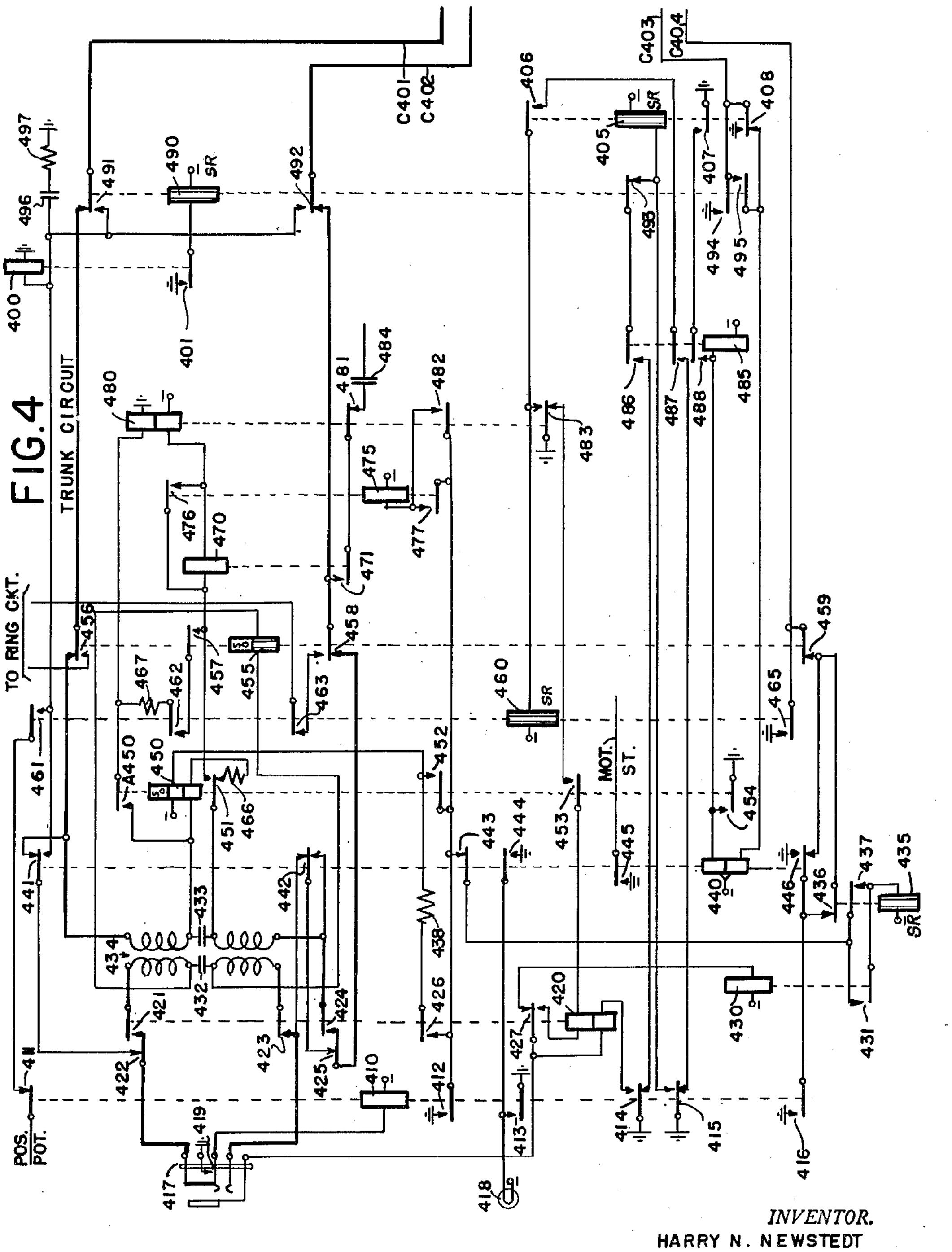
Fig. 4 shows a trunk circuit for establishing connections from the manual switchboard to paystation lines.
Figure 5:
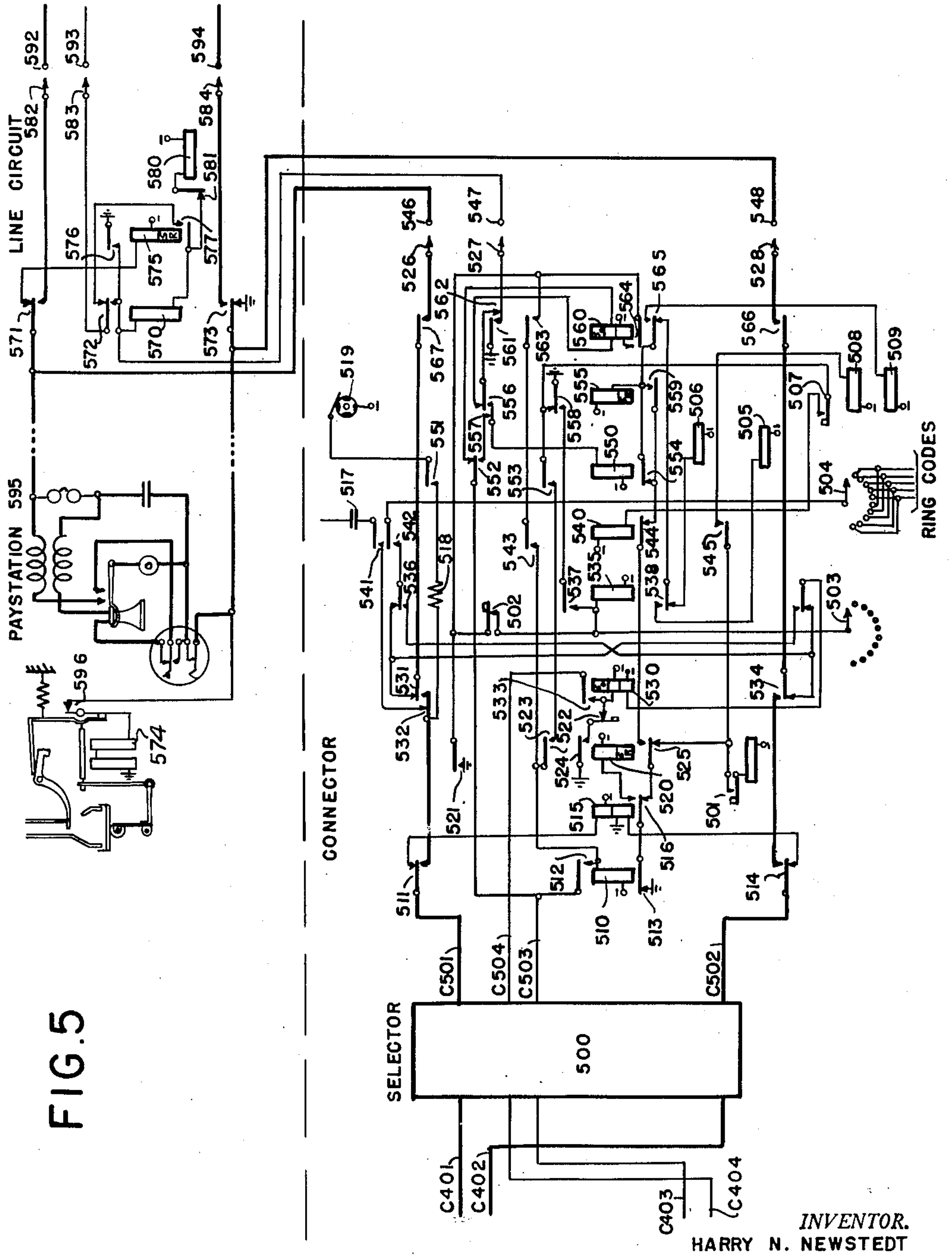
Fig. 5 shows a circuit for an automatic paystation subscribers line, and a rotary lineswitch associated therewith, and circuits for a selector and a connector associated with the trunk circuit in Fig. 4 and the paystation line in Fig. 5.

The trunk circuit shown in Fig. 4 is somewhat similar to the trunk circuit shown in Patent 1,956,374 issued April 24, 1934, to T. F. Crocker. This circuit is used for extending connections from the cord circuit shown in Fig. 1 thru the switch train shown in Fig. 5 to subscriber's lines, particularly to paystation lines such as shown in Fig. 5. The relay 400 is operated either under control of the relay 460 or under control of the keys 330 or 335 to extend coin control potential to the coil 574 of the paystation coin control mechanism. Grounded positive potential, Pos. Pot., connected to armature 411 is from the same source as the Pos. Pot. shown in Fig. 3.

The selector 500 and the connector shown in Fig. 5 are the well known two-motion type and are identical to the selector and connector shown in Crocker 1,956,374 issued April 24, 1934, the specification of which may be seen for a detailed description of both. The conductors C401 and C402 are normally connected to the negative winding and the positive winding respectively of the line relay which is not shown of the selector 500. When the selector 500 switches thru to a connector the line relay of the selector is disconnected and the conductors C401, C402, C403, and C404 are extended to conductors such as the conductors C501, C502, C503 and C504 respectively thru the wipers of the selector and bank contacts which are not shown. The paystation and the lineswitch circuit shown in Fig. 5 are identical to those shown in Patent 2,113,080 issued April 5, 1938, to T. F. Crocker et al. A detailed description of the paystation and the lineswitch circuit may be obtained from Patent 2,113,080. The paystation is equipped with a coin control device and the conventional coin slots for receiving coins. The action of a coin dropping thru any of the coin slots operates the contacts 596 which then remain closed until the coin control mechanism is operated by the magnet 574. The magnet 574 is a polarized device which operates the coin control mechanism to either collect or refund deposited coins depending on whether it is energized by a positive potential or a negative potential.

Figure 2:
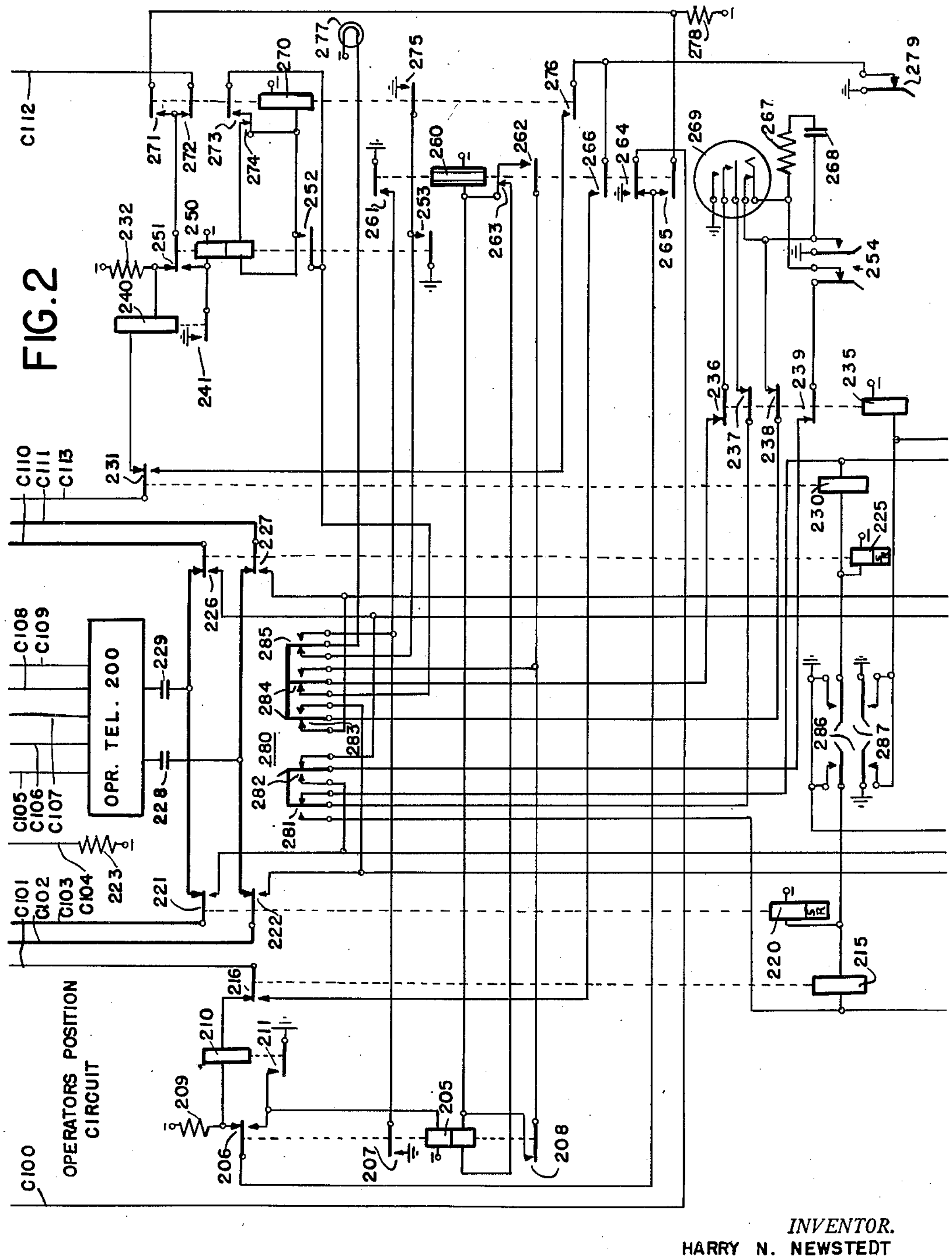
Fig. 2 shows circuits for an operator's telephone and operator's common equipment, primarily for dialing and splitting, for use with the cord circuit in Fig. 1.

The key 279, the relay 270, the relay 430 and the relay 435 provide a modified ringing control feature for the connector shown in Fig. 5 from the operator position shown in Fig. 2. This feature is explained in detail and claimed in the copending application of Harvey W. Balzer.

It is common practice to provide answering circuits at a manual switchboard to which calls from paystations, such as the paystation 595, may be extended for the purpose of requesting toll service. The calls are extended by way of line circuits, such as the line circuit shown in Fig. 5, over conductors such as the conductors 592, 593 and 594 thru switching apparatus of well known type which is not shown. The operator at the manual switchboard after answering a call with a cord circuit, such as the cord circuit shown in Fig. 1 may then ask the calling paystation to disconnect. The operator may then proceed to set up a desired toll connection and, when it is apparent that the call can be properly completed, may connect with the paystation by means of a trunk circuit such as the trunk circuit shown in Fig. 4 and associated switching equipment such as shown in Fig. 5. In case charges for the call are to be assessed against the paystation the coin control device of the paystation may be operated as fully described hereinafter.

Having described the invention in general, a detailed description of a call thru the cord circuit in Fig. 1 to the paystation in Fig. 5 will now be given. Assuming that the plug 171 has been inserted in the jack 117, that the key 150 and the relay 120 are operated, and that the operator desires to extend a connection from the toll line circuit in Fig. 1 to the paystation 595. The call is extended by way of an outgoing trunk circuit such as the trunk circuit shown in Fig. 4. In this case the trunk circuit shown in Fig. 4 is used and the plug 172 is inserted into the jack 417, establishing connection between the upper, center and lower conductors of the plug 172 and the upper, center and lower conductors of the jack 417 respectively and operating the contacts 419. Ground at contacts 419 closes a circuit thru the winding of the relay 410 to battery thus operating the relay 410 which at armature 411 disconnects Pos. Pot. from armature 461, connects ground to the armature 412 for control purposes which will be described subsequently, at armature 413 energizes the lamp 418 to indicate the busy condition of the trunk circuit, at armature 414 connects ground thru the lower winding of the relay 420 to the lower conductor of the jack 417, and at armature 415 closes a circuit from ground thru the winding of the relay 405 to battery. The lower winding of the relay 420 is energized from ground thru armature 414, lower conductors of jack 417 and plug 172, and as the talk key 150 and the relay 120 are operated, thru armature 123, conductor C113, winding of the relay 240 and resistor 232 to battery. The relay 240 does not operate when energized in series with the lower winding of the relay 420 but the relay 420 operates and at contact 422 disconnects the upper conductor of the jack 417 from conductor C401, at armatures 421 and 423 connects the upper and center conductors of the jack 417 respectively to the upper and lower terminals of the left winding of the repeating coil 434, at contact 425 disconnects the center conductor of the jack 417 from the conductor C402, at armature 424 closes a circuit to the lower winding of the relay 450 in series with the line relay of the selector 500 which may be traced over conductor C401, armatures 491 and 456, right winding of repeating coil 434, lower winding of relay 450, resistor 466, armature 457, right winding of repeating coil 434, armatures 424, 458 and 492 and conductor C402 and closes a circuit from ground thru armatures 412 and 426, resistor 438 and the upper winding of the relay 450 to battery. The windings of the relay 450 are energized in opposition at this time and the relay does not operate. The relay 405 energized as previously described operates and at armature 406 prepares a circuit for the relay 460, at armature 407 prepares a circuit for the relay 485 and at armature 408 disconnects the lower winding of the relay 440 from conductor C403 and connects ground over conductor 403 to the selector 500.

The operator now dials the digits required to extend the call by means of the selector 500 and the connector, Fig. 5, to the paystation 595. When the dial 269 is moved off normal the relays 225 and 230 are operated over the following circuit, battery thru the windings of relays 225 and 230, spring 281, armature 233, and the upper three contacts of the dial 269 to ground. The relay 230 on operating opens the circuit to the lower winding of the relay 420 at armature 231 thus allowing the relay 420 to release. The relay 225 also operates and a circuit to the line relay of the selector 500 may now be traced over conductor C401, armatures 491, 456 and 411, contact 422, upper conductors of jack 417 and plug 172, spring 142, armature 127, conductor C110, armature 226, spring 282, armature 239, key 254, lower contacts of the dial 269, armature 238, spring 283, armature 227, conductor C11, armature 129, spring 145, center conductors of plug 172 and jack 417, armature 442, contacts 425, armatures 458 and 492, and conductor C402. The line relay of the selector 500 responds to the impulses of the first digit and steps the wipers of the selector 500 to the corresponding level which in this case would be the level associated with the connector shown in Fig. 5. Assume now that the connector shown in Fig. 5 is the first connector available and that the connection to the paystation 595 is extended thru it.

When the dial restores to normal the circuit to the relays 225 and 230 is opened. The relay 230 restores first and closes the circuit to the lower winding of the relay 420 at armature 231. The relay 420 operates, and shortly thereafter the relay 225, which has a slow release characteristic, restores. The relay 515 is now operated in series with the lower winding of the relay 450 from battery thru the upper winding of the relay 515, armature 511, conductor C501, conductor C401, armatures 491 and 456, right winding of repeating coil 434, lower winding of relay 450, resistor 466, armature 451, right winding of repeating coil 434, armatures 424, 458 and 492, conductors C402 and C502, armature 514 and the lower winding of the relay 515 to ground. The relay 515 operates and at armature 516 closes a circuit to the relay 520. The relay 520 operates, connects ground thru armature 521 and off normal contacts 502 to the winding of the relay 535 causing the relay 535 to operate, closes a circuit to the upper winding of the relay 530 thru armature 524 and off normal contacts 522 and prepares the impulsing circuit at armature 525. The relay 535 prepares a holding circuit for itself at armature 537 and prepares a circuit to the vertical magnet 505 at armature 538. The relay 530 operates and connects its upper winding thru armature 533 to conductor C504.

When the dial 269 is again moved off normal to transmit the next digit in the number of the paystation 595 the relays 225 and 230 operate and the relay 420 restores as previously described thus placing the relay 515 under control of the impulsing contacts of the dial 269. The relay 515 follows the impulses from the dial 269 and at armature 516 closes and opens a circuit to the vertical magnet 505 and the relay 555 in multiple. This circuit may be traced from ground thru armatures 513, 516, 525, 544 and 554 thru the winding of the relay 555 to battery and thru armatures 565 and 538 thru the winding of the vertical magnet 505 to battery. The relay 555 operates on the first closure of this circuit and is equipped with a slow release device which causes it to remain operated while the impulses of a digit are being transmitted. Ground thru armatures 558 and 537 provide a holding circuit for the relay 535. The vertical magnet 505 operates and moves the wipers 526, 527 and 528 to the level corresponding to the dialed digit. Off normal contacts 502 and 522 open when the wipers are first moved off normal thus opening the starting circuits to the relays 535 and 530. The circuit to the relay 520 is interrupted during impulsing but the relay is slow to release and does not restore. After the dial restores to normal the relay 515 remains operated until another digit is dialed. The circuit to the relay 555 is opened at armature 516 allowing the relay 555 to restore and open the holding circuit to the relay 535 which restores and prepares a circuit to the rotary magnet 506. Relay 515 responds to the next digit dialed and at armature 516 closes and opens a circuit to the relay 555 and the rotary magnet 506 in multiple. The rotary magnet moves the wipers 526, 527 and 528 to the bank contact corresponding to the dial digit which in this case are the bank contacts 546, 547 and 548 of the paystation line circuit. Shortly after the dial restores to normal the relay 555 restores and assuming that the paystation line is not busy a circuit is now closed from battery thru the winding of the magnet 580, armature 581, winding of cut-off relay 570, contact 547, wiper 527, contact 562, armature 556, upper winding of the relay 560, armature 552, conductors C503 and C403 to ground at armature 408. The relay 560 operates its armature 564 closing a circuit from battery thru the lower winding of the relay 560 to ground at armature 521. The cut-off relay 570 disconnects ground from one side of the paystation line at armature 573 and disconnects the line relay 575 from the other side of the paystation line at armature 571. The relay 560 operates in full when its lower winding is energized and at armature 561 closes a holding circuit to the cut-off relay 570, at armature 562 prepares a holding circuit to the cut-off relay 570, at armature 562 prepares a holding circuit to the lower winding of the relay 560, at armature 565 prepares a circuit to the operating magnet 509 of the minor switch and at armatures 566 and 567 closes part of a circuit from the wipers 526 and 528 to the conductors C501 and C502. The relay 515 responds to the impulses of the next digit and closes and opens a circuit to the relay 555 in multiple with the operating magnet 509. The relay 555 operates and remains operated until all of the impulses of the digit are received. The rotary magnet 509 operates the wipers 503 and 504 to the contacts corresponding to the digit and on first operation closes the contacts 507. Shortly after the last impulse of the digit is received the relay 555 restores and at armature 558 connects ground thru contacts 507 and the winding of the relay 540 to battery. The relay 540 operates and at armature 543 closes a circuit to the relay 510 from battery thru the winding of the relay 510 and armatures 543, 561 and 521 to ground. The relay 510 operates, connects itself to conductor C503 thru armature 512, disconnects the relay 515 from the conductors C501 and C502 at armatures 511 and 514, and opens the circuit to the relay 520 at armature 513. The relays 515 and 520 restore and the connector is now held under control of the trunk circuit, Fig. 4, relays 510 and 560 being held operated from ground on conductor C503 and the relay 530 being held operated from ground on the conductor C504. The relay 540 is operated over a previously traced circuit preparing a circuit for the ringing code from wiper 504 at armature 542 and the relay 535 is operated or normal depending on the position of the wiper 503. The function of the relay 535 is to select the conductor to which the ringing code will be connected and in this case it is assumed that the wiper 503 stopped on one of the first five bank contacts and that the relay 503 is normal thus a circuit is prepared for the ringing code thru armatures 542 and 536 to the upper conductor of the paystation line.

When the relay 515 is disconnected from the conductors C501 and C502 the circuit to the lower winding of the relay 450 is opened. The relay 450 is slow to operate but shortly after the circuit to its lower winding is opened the armature 452 is operated by the upper winding which is energized in series with resistor 438 as previously described. The armature 452 short circuits the resistor 436 and the relay 450 operates in full connecting ground thru the upper winding of the relay 480 thru armature A450, right winding of repeating coil 434, armatures 456 and 491 to conductors C401 and C501, connecting battery thru the lower winding of the relay 480, winding of the relay 470, armature 451, right winding of repeating coil 434, armatures 424, 458 and 492 to conductors C402 and C502, connecting ground thru armatures 483 and 453 thru the upper winding of the relay 420 and armature 421 to the lower conductors of the jack 417 and the plug 172, and at armature 454 energizes the upper winding of the relay 440 and the winding of the relay 485. The relay 440 at armature 441 connects the winding of the relay 400 to contact 422, at armature 442 prevents the right winding of the repeating coil 434 from being disconnected from conductor C402 in case the relay 420 is restored and at armature 445 connects ground to the Mot. St. lead to start the ringing code equipment. The relay 485 operates and at armature 488 closes holding circuits to itself and the relay 440, at armature 487 prepares a circuit to the relay 460 and at armature 486 prepares a circuit to the relay 405.

To signal the paystation 595 the key 140 is operated and a circuit may be traced from battery thru resistor 223, conductor C104, spring 145, center conductors of plug 172 and jack 417, armature 423, left winding of repeating coil 434, winding of the relay 455, left winding of repeating coil 434, armature 421, upper conductors of jack 417 and plug 172, and spring 142 to ground. The relay 455 operates and its function at this time is to disconnect ground from the conductors C404 and C504 at armature 459 thus releasing the relay 530. The key 140 is then restored allowing the relay 455 to restore and connect ground to the conductor C404. The relay 530 remains at normal and a signalling circuit may now be traced from ringing code thru wiper 504, armatures 542, 536, 531 and 567, wiper 526, contact 546, upper conductor of the paystation line, ringer and condenser at paystation 595, lower conductor of the paystation line, contact 548, wiper 528, armatures 566, 534 and 503 and the lower winding of the relay 530 to battery. The ringing code leads are connected thru an interrupter alternately to direct ground and grounded alternating current potential in the well known manner. Removal of the receiver at the paystation 595 closes a metallic bridge across the line conductors, thus providing a direct current circuit for the lower winding of the relay 530. The relay 530 operates armature 533 connecting its upper winding to ground on conductor C504. The relay 530 is operated in full by its upper winding disconnecting the signalling circuit and closing the talking circuit at armatures 531 and 534. The relay 480 is energized in series with the paystation 595 and supplies transmission battery to the paystation. The relay 480 operates and at armature 482 closes a circuit to the relay 475 and energizes the relay 460 from ground at armature 483. The relay 475 operates, closes a holding circuit to itself at armature 477 and short circuits the winding of the relay 470. The relay 460 operates, prepares a circuit for Pos. Pot. at armature 461, prepares a holding circuit for the relay 480 at armature 462, prepares a circuit for the right Ring Ckt. conductor at armature 463 and connects a ground to the conductor C404 at armature 465.

The operator now converses with the party at the paystation 595, and if charges are to be paid by the paystation, asks for a deposit which is inserted in the coin control mechanism in the well known manner operating the contacts 596. After the conversation has been completed the operator may collect or refund the deposit by operating the keys 335 or 330 respectively with the talk key 150 operated. The operation of the key 335 operates the relays 225 and 230 and releases the relay 420 as previously described. Pos. Pot. thru lamp 342, winding of relay 315, spring 339, armature 226, conductor C110, armature 127, spring 142, upper conductors of plug 172 and jack 417, contact 422, armature 441, and the winding of the relay 400 to ground. The relay 400 operates and energizes the relay 490. The relay 490 operates and at armatures 491 and 492 extends Pos. Pot. over conductors C401 and C402 and C501 and C502 to both sides of the paystation line. The contacts 596 are operated by the deposited coins and a circuit for Pos. Pot. is thus provided thru contacts 596 and the windings of the magnet 574 to ground. The magnet 574 when energized by Pos. Pot. operates the coin control mechanism to the collect position and the coins are accordingly deposited in the associated coin box. Restoring the key 335 opens the circuit to the relay 400 which restores and in turn opens the circuit to magnet 574 which allows the coin control mechanism to restore and also open the contacts 596 which remain open until another coin is deposited. Likewise operation of the key 330 connects Neg. Pot. to the paystation line, and if the contacts 596 are made the magnet 574 energized by Neg. Pot. operates the coin control mechanism to the refund position to refund deposited coins.

In case the operator does not operate either key 330 or key 335 and removes the plug 172 from the jack 417 the circuit to the relay 410 is opened at contacts 419. The relay 410 in restoring connects Pos. Pot. thru armatures 411 and 461 thru the winding of the relay 400 to ground and closes a holding circuit to the relay 405 thru armatures 414, 486 and 493. The relay 410 also opens the circuits of relays 420, 450 and 475 which restore at this time. The relay 400 operates the relay 490 and Pos. Pot. is extended to the paystation 595 and deposited coins are collected as previously described. The relay 490 also opens the circuit to the relay 405 which restores and opens the circuits of relays 440, 485 and 460. The relays 405 and 460 are slow to release so that ample time for the operation of the magnet 574 is provided. The selector and connector are held operated until the relay 490 releases by ground connected at armature 494 to conductor C403, and the circuit to the paystation 595 is maintained thru armatures 531 and 534 by ground connected thru armature 465 to conductor C404. The relays 440, 485 and 460 restore, the relay 460 opening the circuit to the relay 400 at armature 461 and disconnecting ground from the conductor C404 at armature 465 to allow relay 530 to restore. The relay 400 restores and opens the circuit of relay 490 which removes ground from the conductor C403 at armature 494 to allow the selector and connector in Fig. 5 to restore and free the paystation line circuit.

In case the operator has operated either key 330 or key 335 prior to removing the plug 172 from the jack 417 the relays 400 and 490 are operated when the plug 172 is removed from the jack 417 but the contacts 596 are open and no operation of the coin control mechanism results. However, the release of the trunk circuit, Fig. 4, and the selector, the connector and the line circuit shown in Fig. 5 takes place as previously described. If a call extended to a paystation is not answered the relay 480 is not operated and consequently the relay 460 is not operated. Removal of the plug 172 from the jack 417 releases the relay 410. The relay 405 is opened at armature 415 and as the relay 460 is not operated the holding circuit to the relay 405 from armature 414 is open at armature 464. The relay 405 releases and by disconnecting ground from the conductor C403 and opening the relay 440, which restores and disconnects ground from the conductor C404, allows the connector and selector in Fig. 5 to release. It may be noted that in case a call is not answered that Pos. Pot. is not connected to the paystation line circuit as the relays 400 and 490 are not operated.

Having described my invention, what is considered to be new and is desired to be protected by Letters Patent will be set forth in the following claims.

What is claimed is:

1. In a telephone system, a trunk circuit having conductors, an operator position circuit, means including a plug and jack at said position circuit for connecting said position circuit to said trunk circuit, a relay in said trunk circuit, a source of coin collect potential, a collect key in said operator position circuit, a circuit including said plug and jack completed responsive to the manual operation of said coin collect key for operating said relay, coin control circuit means responsive to the operation of said relay for connecting said coin collect potential to said conductors to effect a coin collect control operation over the conductors of said trunk circuit, and a second relay circuit automatically completed upon the disconnection of said operator position from said trunk circuit in response to the removal of said plug from said jack for operating said relay, said coin control circuit means responsive to said last mentioned operation of said relay for connecting said coin collect potential to said conductors to effect a coin collect control operation over the conductors of said trunk circuit.

2. In a telephone system, paystations, a coin control mechanism for each paystation, an operator position, a trunk circuit terminating in a jack at said position, means including a plug and said jack at said position for originating and establishing connections from said operator position to any one of said paystations, a relay in said trunk circuit, a source of coin collect potential, a collect key in said operator position, a circuit including said plug and jack completed responsive to the manual operation of said coin collect key for operating said relay in case a connection originating from said operator position is established over said plug and said jack at said operator position to one of said paystations, coin control circuit means responsive to the operation of said relay for connecting said coin collect potential to the coin control mechanism of a connected paystation to operate said mechanism, a second relay circuit completed for automatically operating said relay in case said operator position is disconnected from said trunk circuit by the removal of said plug from said jack, and said coin control circuit means responsive to the automatic operation of said relay for connecting said coin collect potential to the coin control mechanism of a connected paystation to operate said mechanism.

3. In a telephone system, a trunk circuit, outgoing conductors for said trunk circuit, a control circuit, means for connecting said control circuit to said trunk circuit, a source of coin collect potential, a first relay, a second relay, a third relay, means for operating said second relay responsive to said connection of said control circuit to said trunk circuit, means for operating said first relay with said control circuit connected to said trunk circuit, a circuit including said source and operated contacts on said first relay completed by said control circuit for energizing said third relay, said second relay restored responsive to the disconnection of said control circuit and said trunk circuit, another circuit including said source and contacts closed by the restoration of said second relay for energizing said third relay, means controlled by the operation of said third relay when energized by said source of potential for controlling the connection of said source of potential to at least one of said outgoing conductors, and coin collect mechanism connected to said outgoing conductors controlled by the connection of said source to said conductor.

4. In a telephone system, a control circuit, an automatic switch train, a trunk circuit, means for connecting said control circuit to said trunk circuit, means for controlling said switch train from said control circuit in case said control circuit is connected to said trunk circuit, a source of coin collect potential, a relay, means for operating said relay, a first holding circuit for said switch train completed by the operation of said relay, another relay, manual means for operating said other relay under control of said control circuit, means operated by said other relay for connecting said source to said switch train means for automatically operating said other relay upon the disconnection of said control circuit from said trunk circuit, said automatic operation of said other relay controlling said source connecting means to connect said source to said switch train, means responsive to the operation of said other relay for releasing said first relay to open said first holding circuit, another holding circuit for said switch train, and means operated by said other relay for completing said other holding circuit for said switch train.

5. In a telephone system, a trunk circuit having talking conductors, a relay in said trunk circuit, a coin collect potential, a coin collect mechanism, an operator position, operator controlled means for establishing a connection from said position to said trunk circuit, means for further extending said established connection to connect said conductors of said trunk circuit to said coin collect mechanism, a first relay circuit including only one talking conductor of said trunk circuit prepared for operating said relay responsive to the extension of said connection to said coin collect mechanism, a coin collect key, means responsive to the manual operation of said coin collect key for connecting said coin collect potential to said prepared first relay circuit to complete said first relay circuit to operate said relay over said one talking conductor, a second relay circuit for operating said relay independent of said one talking conductor, means automatically operated in response to the disconnection of said operator position from said trunk circuit for connecting said coin collect potential to said second relay circuit to complete said second relay circuit to operate said relay, and means operated in response to the operation of said relay over either relay circuit for connecting said coin collect potential to said conductors to control the operation of said coin collect mechanism over said extended connection.

HARRY N. NEWSTEDT.

REFERENCES CITED

The following references are of record in the file of this patent:

UNITED STATES PATENTS

| Number | Name | Date |
|---|---|---|
| 1,616,402 | Wicks | Feb. 1, 1927 |
| 1,753,334 | Curley | Apr. 8, 1930 |
| 1,917,884 | Hague | July 11, 1933 |
| 2,217,041 | Boswau | Oct. 8, 1940 |
| 2,226,730 | Lomax | Dec. 31, 1940 |
| 2,357,576 | Brooks et al. | Sept. 5, 1944 |